US009313376B1

(12) United States Patent  
Bertolami et al.

(10) Patent No.: US 9,313,376 B1  
(45) Date of Patent: Apr. 12, 2016

(54) DYNAMIC DEPTH POWER EQUALIZATION (75) Inventors: Joseph Bertolami, Seattle, WA (US); John Allen Tardif, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 12/416,757

(22) Filed: Apr. 1, 2009

(51) Int. Cl.
*H04N 5/228* (2006.01)
*H04N 5/222* (2006.01)
*H04N 5/225* (2006.01)
*H04N 1/00* (2006.01)

(52) U.S. Cl.
CPC ........... *H04N 5/225* (2013.01); *H04N 1/00161* (2013.01)

(58) Field of Classification Search
USPC ........ 348/48, 152–155, 207.11, 208.1, 208.4, 348/208.16, 211.2, 211.99
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |

(Continued)

FOREIGN PATENT DOCUMENTS

| CN | 101254344 B | 6/2010 |
| EP | 0583061 A2 | 2/1994 |

(Continued)

OTHER PUBLICATIONS

Huhle, B. et al, "Integrating 3D Time-of-Flight Camera Data and High Resolution Images for 3DTV Applications", http://ieeexplore.ieee.org, 4 pages Downloaded Apr. 1, 2009.

(Continued)

*Primary Examiner* — Trung Diep
(74) *Attorney, Agent, or Firm* — Gregg Wisdom; Judy Yee; Micky Minhas (57) ABSTRACT

Disclosed herein are systems and methods to control the power consumption of a battery powered platform comprising at least one depth camera. The battery powered platform may adjust the consumption of one or more systems of the depth camera, or other systems on the battery powered platform to alter the power consumption of the battery powered platform.

19 Claims, 7 Drawing Sheets

(56) References Cited

U.S. PATENT DOCUMENTS

| | | |
|---|---|---|
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,304,681 B2 | 12/2007 | Larner |
| 7,308,112 B2 | 12/2007 | Fujimura et al. |
| 7,312,821 B2 * | 12/2007 | Voss et al. .................. 348/220.1 |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,409,188 B2 | 8/2008 | Syrjarinne |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,911,496 B2 * | 3/2011 | Sawachi .................. 348/42 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,743,226 B2 * | 6/2014 | Lee .................. 348/216.1 |

(56) References Cited

U.S. PATENT DOCUMENTS

| | | | |
|---|---|---|---|
| 2003/0093805 A1 | 5/2003 | Gin | |
| 2004/0179100 A1* | 9/2004 | Ueyama | 348/152 |
| 2005/0232491 A1* | 10/2005 | Chang et al. | 382/199 |
| 2007/0058038 A1* | 3/2007 | David et al. | 348/135 |
| 2008/0026838 A1 | 1/2008 | Dunstan et al. | |
| 2008/0031327 A1 | 2/2008 | Wang | |
| 2008/0166115 A1* | 7/2008 | Sachs et al. | 396/55 |
| 2008/0220867 A1 | 9/2008 | Zalewski | |
| 2008/0278580 A1 | 11/2008 | Bentkovski | |
| 2008/0291288 A1 | 11/2008 | Tzur | |
| 2010/0225779 A1* | 9/2010 | Muukki | 348/223.1 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Niclass, C. et al., "A CMOS 3D Camera with Millimetric Depth Resolution", Swiss Federal Institute of Technology, http://aqua.epfl.cg, 4 pages Downloaded Apr. 1, 2009.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

* cited by examiner

DYNAMIC DEPTH POWER EQUALIZATION

BACKGROUND

A battery powered platform is limited in its functionality by the charge capacity and output capabilities of the battery. Adding certain types of systems to a battery powered platform, such as a depth camera, further complicates this problem because the functionality of the depth camera may be heavily reliant on costly bursts of infrared emission for sensing the depth of a scene.

Other types of systems on a battery operated platform may also exhibit similar costly drains on a battery; drains which may be exacerbated or rendered unnecessary because of movement of the system.

SUMMARY

The following discloses systems and methods to conserve the limited power afforded by a battery to a battery operated platform. In various embodiments, these systems and methods to conserve power may be provided to a stereoscopic platform or an augmented reality platform with a depth camera. Information about the motion of the depth camera or the motion of one or more objects in a capture area may be used to adjust the output power to each of one or more systems on a battery operated platform. One or more sensors may provide the information about motion of the depth camera and objects in a capture area.

A processing unit of the battery operated platform may use the information provided by one or more sensors to determine the acceptable output power provided to a depth camera. The processing unit of the battery operated platform may also determine the acceptable output power provided to other systems of the battery operated platform. Changes in power may be related to changes in the processes of one or more subsystems of the depth camera, for example, the duration, intensity and frequency of infrared (IR) bursts from emitters on the depth camera. The processing unit may also alter the resolution, frame rate, capture area and capture length to preserve the overall quality of the depth image. Similarly, the frame rate, capture length, capture area, resolution, brightness, or any other aspect of the systems on a battery operated platform may be monitored and adjusted to maintain a steady power state, or minimize the power consumption of the battery powered platform.

In one embodiment, determinations based on information from one or more systems on a battery powered platform may be used at a per-frame granularity to control the output and thus the power consumption of various systems.

The processing unit may also use information about one or more objects in a capture area of a depth camera to determine the output power provided to each system on a battery powered platform. For example, if an object in a capture area is to be detected, the depth camera may adjust the focus and resolution of the depth camera or other cameras in the full x/y and z dimensions of the object.

BRIEF DESCRIPTION OF THE DRAWINGS

The systems, methods, and computer readable media for dynamic depth power equalization in accordance with this specification are further described with reference to the accompanying drawings in which.

DETAILED DESCRIPTION OF ILLUSTRATIVE EMBODIMENTS

As will be described herein, a battery powered platform comprising a depth camera and a processor may determine power consumption of the platform. The battery powered platform may then adjust the consumption of one or more systems on the battery powered platform to alter the power consumption.

Figure 1:
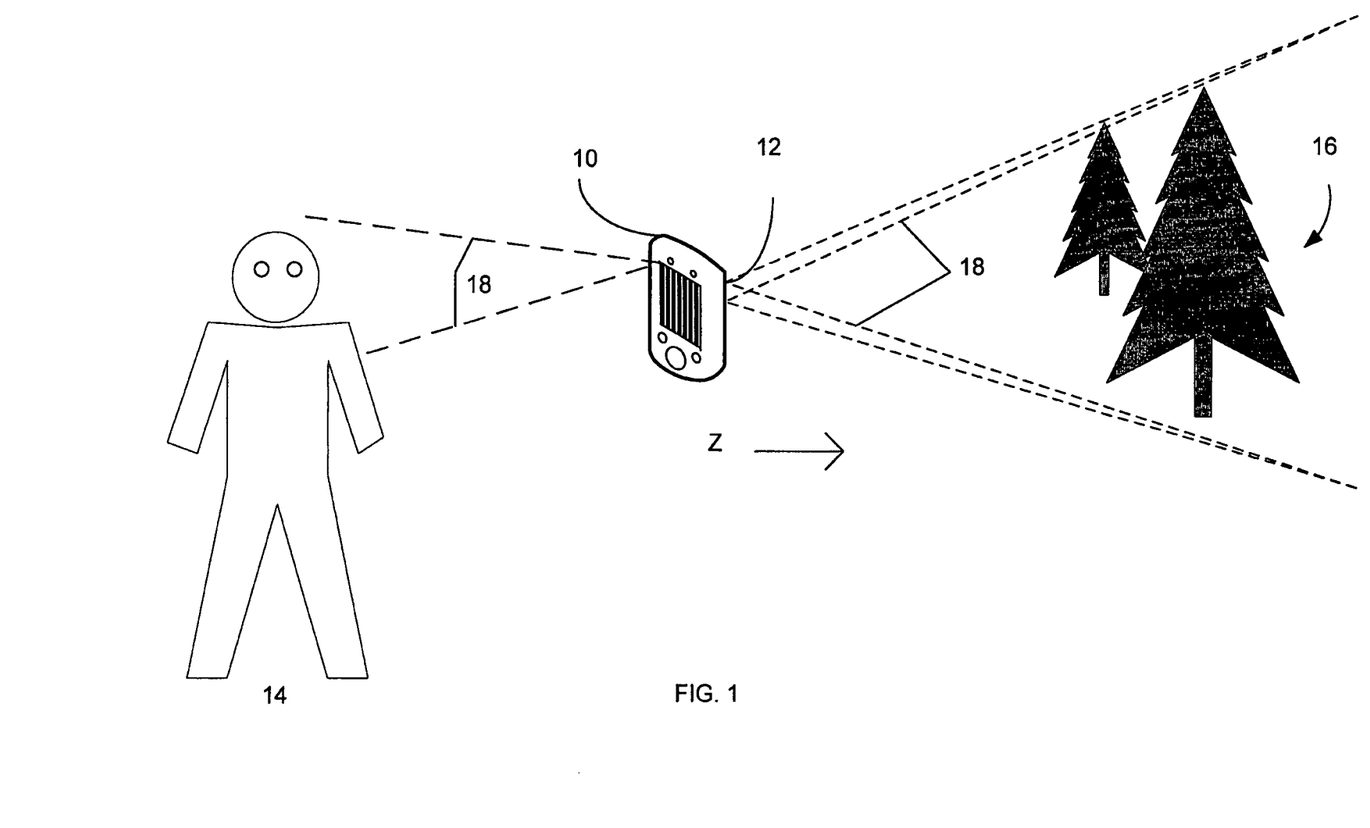
FIG. 1 depicts a person standing with a battery powered platform that may have dynamic depth power equalization implemented thereon, where there are objects in capture areas.

FIG. 1 illustrates an example embodiment of a battery operated platform 10. The battery operated platform 10 may comprise a depth camera 12, along with any other devices that may be powered by a battery. The battery operated platform may be operated by user 14. The device may be a portable device for user 14, which may be handheld or otherwise carried by user 14. Alternatively, the device may be mounted in other ways that may be useful for a user. For example, the device may be mounted in a vehicle such as an automobile, plane or boat. In one embodiment, such a device may be mounted in a vehicle, then carried by a user and used portably, and then used as part of a desktop computing system.

According to an example embodiment, the depth camera 12 may be configured to capture depth information (indicated as the Z axis in FIG. 1) including a depth image that may include depth values via any suitable technique including, for example, time-of flight, structured light, stereo image or the like. According to one embodiment, the depth camera may organize the calculated depth information in Z layers, or layers that may be perpendicular to a Z axis extending from the depth camera along its line of sight.

The depth camera 12 may include an infrared (IR) light component, a three-dimensional (3-D) camera, and a red, green, blue (RGB) camera that may be used to capture the depth image of capture areas 18. For example, in time-of-flight analysis, the IR light component may emit an infrared light onto the capture areas 18 and may then use the depth camera detector to detect the backscattered light from the surface of one or more targets and objects in the scene using, for example, a 3-D camera and/or an RGB camera. In some embodiments, pulsed infrared light may be used such that the time between an outgoing light pulse and a corresponding incoming light pulse may be measured and used to determine a physical distance from the battery powered platform to a particular location on the targets or objects 16 in the capture area. Additionally, in other example embodiments, the phase of the outgoing light wave may be compared to the phase of the incoming light wave to determine a phase shift. The phase shift may then be used to determine a physical distance from the capture device to a particular location on the targets or objects 16.

According to another example embodiment, time-of-flight analysis may be used to indirectly determine a physical distance from the depth camera to a particular location on the targets or objects 16 by analyzing the intensity of the reflected beam of light over time via various techniques including, for example, shuttered light pulse imaging.

In another example embodiment, the depth camera may use a structured light to capture depth information. In such an analysis, patterned light (i.e., light displayed as a known pattern such as grid pattern or a stripe pattern) may be projected onto the scene via, for example, the IR emitters. Upon striking the surface of one or more targets or objects in the scene, the pattern may become deformed in response. Such a deformation of the pattern may be captured by, for example, a 3-D camera and/or the RGB camera and may then be analyzed to determine a physical distance from the capture device to a particular location on the targets or objects.

The depth camera 12 may be able to capture information including depth information about one or more objects 16 using one or more of the methods described above. The depth information about the one or more objects 16 may be contained in a depth image, which may include a two-dimensional (2-D) pixel area of the captured scene where each pixel in the 2-D pixel area may represent a depth value such as a length or distance in, for example, centimeters, millimeters, or the like of an object in the captured scene from the camera.

One or more capture areas 18 may be associated with one or more depth cameras such as depth camera 12 or other detectors on a battery powered platform. The capture areas may comprise an area of space that a depth camera may view. For example, the capture areas may be the full field of view of a depth camera. In another embodiment, the capture areas may be one or more smaller portions of the full field of view of the depth camera. Capture areas may be centered on one or more objects 16.

The depth camera 12 may include one or more emitters (not shown) including, for example, IR emitters, which may be used to sense the depth of one or more objects 16 or users 14 in capture areas 18. In an example embodiment, objects at a greater distance from the depth camera 12 may require a stronger output from the emitters. Accordingly, two or more of the available emitters may emit radiation. The radiation from the emitters may be reflected or scattered off of one or more objects 16 according to the methods described above, which may be used to determine, through any means known in the art, the distance from the one or more objects 16 to the depth camera 12.

The one or more emitters may be any emitters that may be used in the sensing of depth via a depth camera. In one embodiment, the emitters may emit IR radiation. In another embodiment, the emitters may emit in the visible portion of the spectrum, or the ultraviolet, while in another embodiment, the emitters may be microwave emitters or the like.

Figure 2:
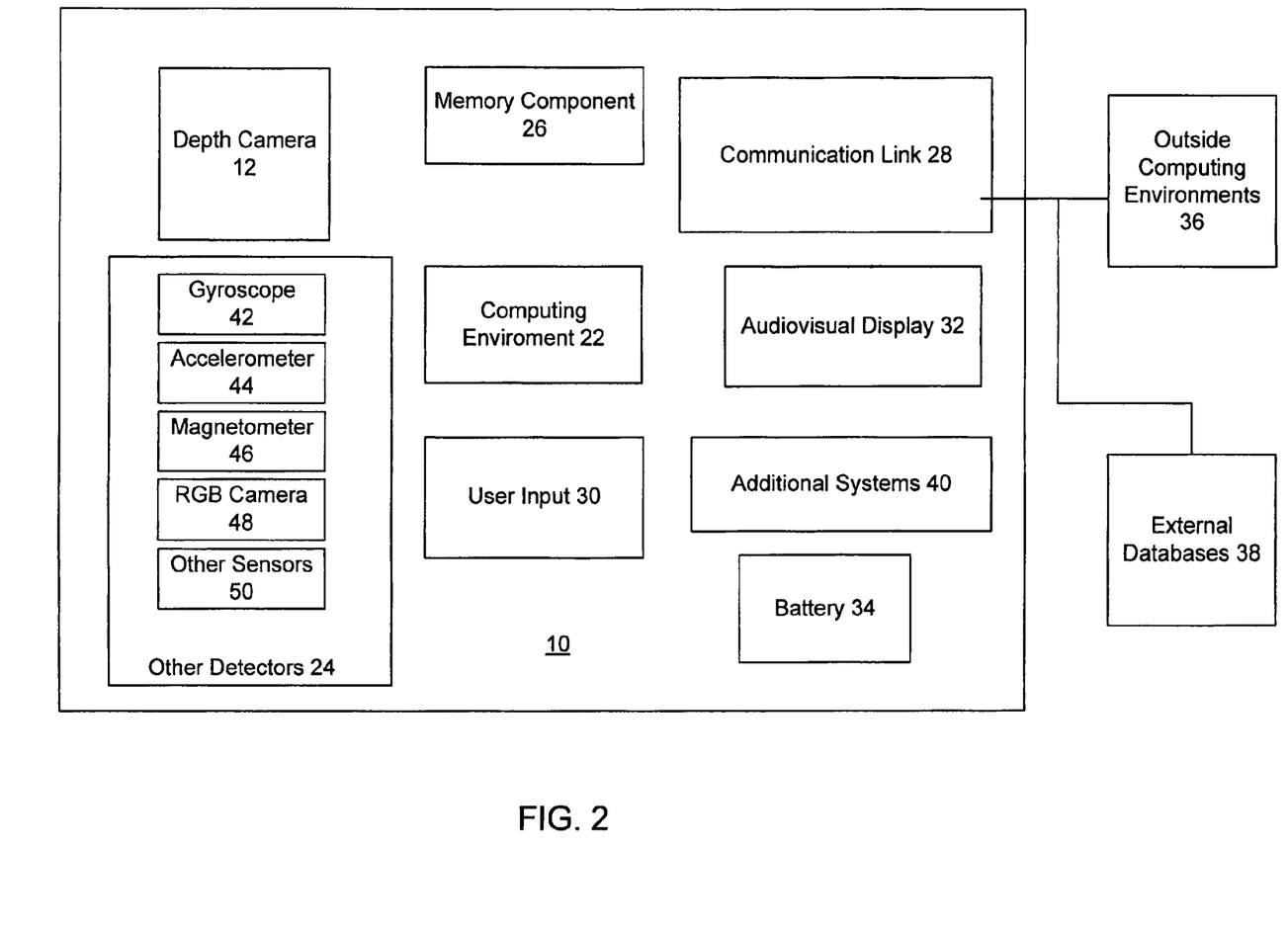
FIG. 2 is a block diagram of an equalized battery powered platform comprising several systems, one of which is a depth camera.

FIG. 2 depicts a sample embodiment of battery powered platform 10. As noted above, battery powered platform 10 may comprise a depth camera 12 along with other systems. In one embodiment, the battery powered platform may comprise at least one of a stereoscopic device or an augmented reality device. The battery powered platform may integrate a phone, PDA, laptop or desktop computer, gaming system, display or any other device. There may be one or more displays, where the display may be at least one of a cathode ray display, plasma, liquid crystal display (LCD), a light emitting diode (LED) display, an image projection device or any other display.

A computing environment 22 may be included in the battery powered platform 10. The computing environment may be in operative communication with each of the systems on a battery powered platform. The computing environment may include a standardized processor, a specialized processor, a microprocessor, or the like that may execute instructions that may include instructions for receiving the depth image, determining whether a suitable target may be included in the depth image, determining the power consumption of a depth camera and configuring subsystem power consumption or any other suitable instruction.

In an example embodiment, the computing environment 22 may receive information from the depth camera 12, along with other detectors 24. The computing environment 22 may use the information from other detectors 24 and the depth camera 12 to control the power consumption of each of the systems on the battery operated platform.

The battery powered device 10 may further include a memory component 26 that may store the instructions that may be executed by the computing environment 22, images or frames of images captured by the depth camera, a 3-D camera or RGB camera, user profiles or any other suitable information, images, or the like. According to an example embodiment, the memory component 26 may include random access memory (RAM), read only memory (ROM), cache, flash memory, a hard disk, or any other suitable storage component. As shown in FIG. 1, in one embodiment, the memory component 26 may be a separate component in communication with the depth camera and the computing environment 22. According to another embodiment, the memory component 26 may be integrated into the processor 22 and/or the depth camera or the other systems.

As shown in FIG. 2, the battery powered device 10 may be in communication with an outside computing environment 36 or outside databases 38 via a communication link 28. The communication link 28 may be a wired connection including, for example, a USB connection, a Firewire connection, an Ethernet cable connection, or the like and/or a wireless connection such as a wireless 802.11b, g, a, or n connection.

The other detectors 24 on a battery operated platform may include sensing systems such as a gyroscope 42, an accelerometer 44, an RGB camera 48, a magnetometer 46 or the like. Sensing systems may also be audio sensing devices such as a microphone shown as other sensors 50 in other detectors 24. The other detectors 24 may be used to provide information concerning the motion of the battery operated platform. The other detectors 24 may also be used to capture images of one or more objects that may be used as a reference, a means of comparison or the like. In one embodiment, multiple images are captured by other detectors 24 to provide stereoscopic images that may be used by the battery powered platform 10, while images of a user may also be captured to provide information to the battery powered platform about the user. The images of the user may be used to provide stereoscopic information to the user.

Information from the other detectors 24 may be used in combination with information from a depth camera such as depth camera 12. Use of the information from an other detector, such as, for example, one or more of a gyroscope 42, accelerometer 44, magnetometer 46, RGB camera 48 or other sensor 50 may allow a computing environment such as computing environment 22 to determine the motion of the battery operated platform and the motion of one or more objects in a capture area.

In an example embodiment, the other detectors may provide information to computing environment 22, which may adjust the power consumption of one or more of the other detectors. For example, in an embodiment of a battery powered platform that includes an RGB camera, the resolution, field of view and refresh rate of the RGB camera may be adjusted by the processing system as a means of adjusting the power consumption of the RGB camera.

In an example embodiment, the other detectors 24 and depth camera 12 on a battery operated platform may provide updates to the computing environment 22 on a real time basis. The computing environment 22 may also provide feedback to the other detectors 24 and the depth camera on a real time basis, which may allow the system to adapt at each frame. In other words, each time an image is captured by the depth camera, or by any other detector on the battery powered platform, the system may adapt the power consumption of the platform, as well as the usage of the device for the next frame.

Battery powered platform 10 may also include user input 30 that may be used by a user such as user 14 described according to FIG. 1. User input 30 may be any means that a user may use to communicate with a battery powered platform. In one embodiment, user input 30 takes the form of a keyboard, a mouse, a touch pad/screen, a microphone, a number pad, a controller such as a game controller or a joystick, gesture based input or any other means currently known or discovered in the future for a user providing input to a computing environment. The user input may comprise one or more of the detectors 24 or depth cameras 12. In another embodiment, the user input is a separate element attached via a USB or serial port. In another embodiment, the user input takes the form of a transmission or communication from an outside computing environment such as 36.

Battery powered platform 10 may also include an audiovisual display device 32. The audiovisual device 32 may be one or more screens, a projector, earphones or a speaker. The screen may be on the handheld device, or may take the form of sunglasses or a helmet with a heads up type display or the like as a visual output. In another embodiment, the battery powered device provides an output to an audiovisual device such as a television or a computer monitor or a laptop or projector or the like.

The additional systems 40 on a battery operated platform may include other systems, such as a USB port for connecting a mouse or a keyboard. Additional systems 40 may include a global positioning system, a security system, a power sensor determining the remaining charge of a battery, or the like which may be included on a battery powered platform such as battery powered platform 10.

Battery operated platform 10 may include a battery 34. The battery 34 may be any device which may store charge. In one embodiment, the battery may be a rechargeable battery such as a lithium ion battery, or any other rechargeable battery that may be known now or in the future. In another embodiment, any type of disposable battery may be used on the battery operated platform 10.

Figure 3:
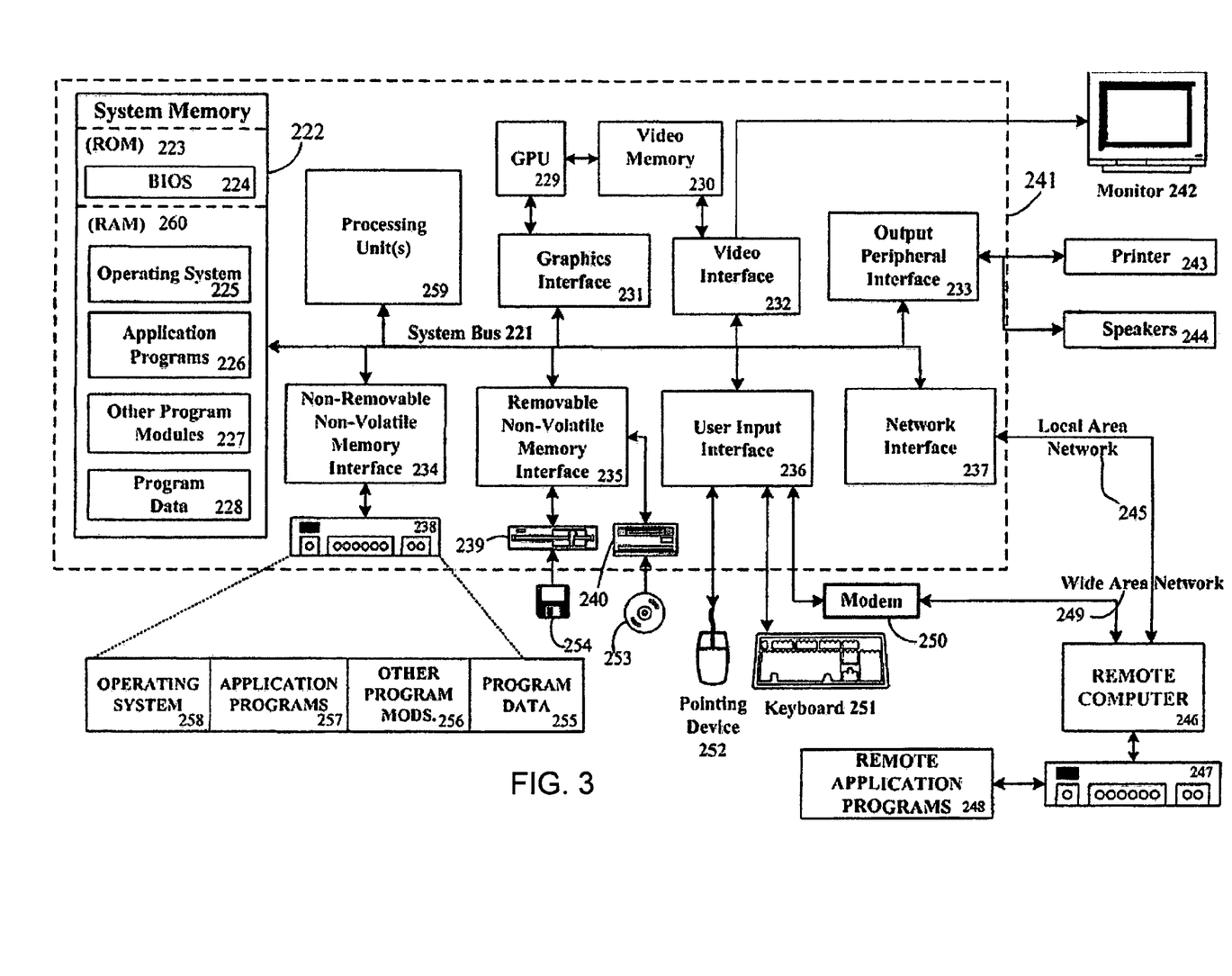
FIG. 3 illustrates an example embodiment of a computing environment that may be used to interpret one or more gestures in a battery powered platform, or an external computing environment.

FIG. 3 illustrates an example embodiment of a computing environment that may be used in a battery powered platform such as battery powered platform 10, such as, for example, computing environment 22, or a computing environment that may be connected to battery powered platform 10 by means of communication link 28, such as, for example outside computing environment 36 or external databases 38. The computing system environment of FIG. 3 is only one example of a suitable computing environment and is not intended to suggest any limitation as to the scope of use or functionality of the presently disclosed subject matter. Neither should the computing environment be interpreted as having any dependency or requirement relating to any one or combination of components illustrated in the exemplary operating environment. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3, the computing environment comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3 illustrates operating system 225, application programs 226, other program modules 227, and program data 228.

The computer 241 may also include other removable/non-removable, volatile/nonvolatile computer storage media. By way of example only, FIG. 3 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3, provide storage of computer readable instructions, data structures, program modules and other data for the computer 241. In FIG. 3, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3. The logical connections depicted in FIG. 3 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3 illustrates remote application programs 248 as residing on memory device 247. It will be appreciated that the network connections shown are exemplary and other means of establishing a communications link between the computers may be used.

Figure 4:
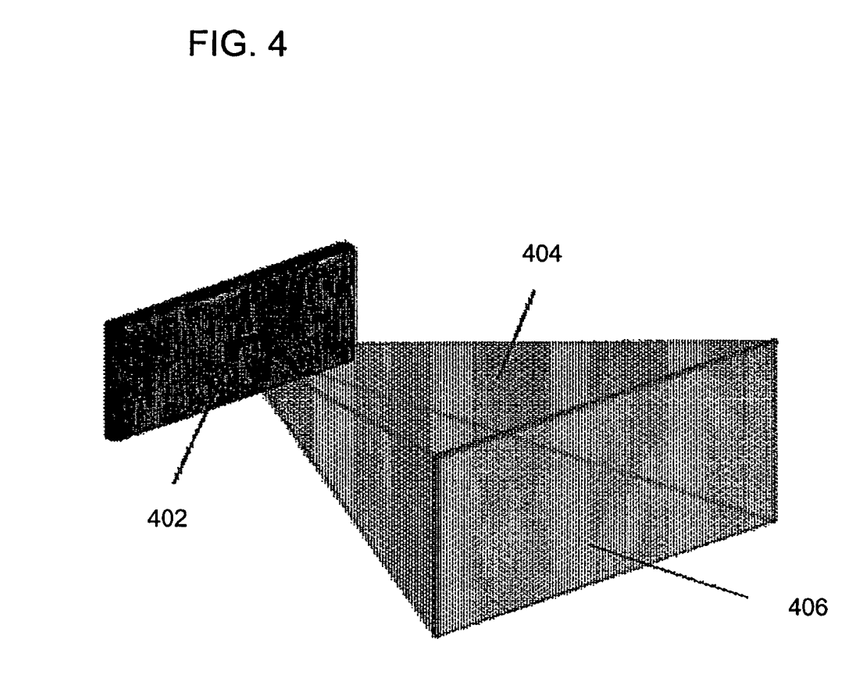
FIG. 4 depicts a three dimensional model of a capture area.

FIG. 4 depicts a three dimensional model of a capture such as capture area 18 described above with reference to FIG. 1. The detector on a depth camera such as depth camera 12 described above with reference to FIGS. 1-3, may be located at 402. In one embodiment, the detector may have one or more optical elements that transmit radiation in a specific portion of the electromagnetic spectrum, such as, for example, the IR portion of the spectrum. These optics may be fixed, or they may be adjustable. Adjusting optics may alter the extent of capture area 404, and may adjust the depth plane 406 that the depth camera 12 may detect. The extent of depth plane 406 that the depth camera can detect, may depend on one or more elements of the depth camera. For instance, the number of depth sensing pixels may determine the resolution that the depth camera may have, and accordingly, if an object is too far from the depth camera, the depth camera may not be able to resolve it. In another example, the amount of radiation, such as IR radiation, that the depth camera outputs from one or more emitters (not shown and described below) may determine the maximum distance that an object may be detected from the depth camera. Increasing the amount of IR radiation emitted from the depth camera may increase the amount of scatter or reflection from one or more objects, which may make objects that are further away detectable, or more easily detectable by depth camera 12.

Figure 5:
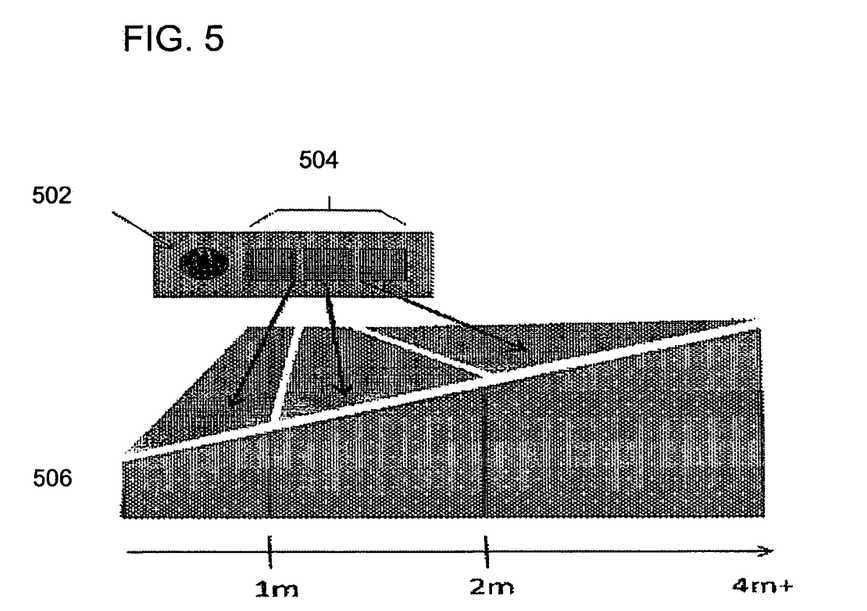
FIG. 5 depicts emitters and a detector on a depth camera, and the relationship between the emitters and depth detection.

FIG. 5 depicts a representation of a series of emitters 504 that may be incorporated by a depth camera detector 502. Each emitter may emit the same amount of radiation, or each emitter may be adjustable to emit different amounts of radiation. The amount of radiation emitted by emitters 504 may be related to the maximum detection distance 506 that an object may be from the depth camera. FIG. 5 has units of 1-3 meters, however, these numbers are merely an example, and in no way are limiting on the actual maximum detection distance 506, or the amount of increase that may be seen in the maximum detection distance 506 based on emission from an additional emitter 504.

In one embodiment, if an object of interest is an object near to the depth camera, only one emitter 504 may need to emit to determine the depth of the object. In another example, if an object is at a middle distance or moving at moderate speed, two emitters may be used to determine the depth of the object. In another embodiment, if an objects is far from the depth camera and/or moving at high speed, three or more emitters may be used to determine the distance from the depth camera to the object.

In one embodiment, varying the number of emitters 504 that are emitting, the computing environment 22 referenced in FIG. 2 may adjust the power consumption of the depth camera. In another embodiment, the computing environment 22 may be able to adjust the length, strength and number of emission pulses from one or more emitters 504 in order to adjust the power consumption of the depth camera.

Other aspects of the capture areas 18, the emitters 504, the detector 502 may be adjusted in order to change the current power consumption of the depth camera. The field of view of the detector may be adjusted. The field of view that one or more emitters emits into may be adjusted. The resolution of the 2-D image of the depth camera may be adjusted by, for example, operating only every other pixel of the depth camera detector 502, or by grouping pixels or the like. The refresh rate of the depth camera may be adjusted. The length of individual frame captures may be adjusted. Additionally, areas of the 2-D depth image may be selectively utilized. For example, if there are two or more objects of interest in a capture scene, the computer processor may perform one or more operations to ignore or power off elements of the depth camera that are not related to the two or more objects.

Any other system on the battery powered platform 10 such as other detectors 24 referenced in FIG. 2, or audiovisual device 32 may have their power consumption adjusted by computing environment 22. For example, the brightness, refresh rate, resolution or the like of a visual display device may be adjusted. The volume, range and frequency of an audio device may be adjusted. The sensitivity of a microphone may be adjusted. A wireless device may be powered on or off, or the signal strength may be tuned. If the battery powered platform contains one or more cameras, the refresh rate, resolution, capture area and capture rates may all be adjusted. For any other sensors, refresh rates, capture rates and resolutions may be adjusted as well.

Figure 6:
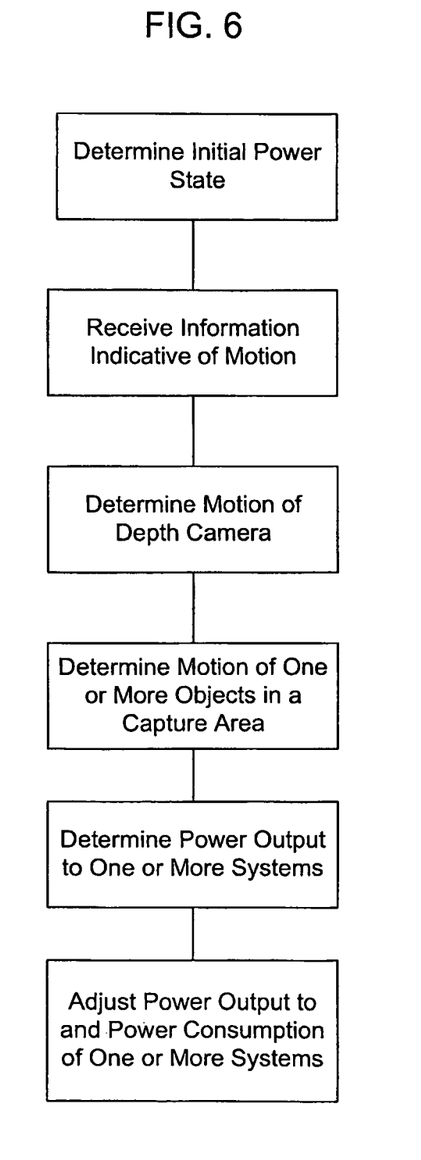
FIG. 6 is a block diagram of an example method of dynamic power equalization on a battery powered platform.

FIG. 6 shows an example method 600 that may be used by a computing environment such as computing environment 22 to control the power provided to a depth camera or other systems on a battery operated device. At step 602, a computing environment may determine the remaining power in a battery such as battery 34 referenced in FIG. 2, and may receive information about one or more systems on the battery powered platform 10 in order to determine the current power state of the battery powered platform. At 604, computer environment 22 may receive information indicative of motion of the depth camera. This information may be provided by one or more of the other detectors 24, which may include a gyroscope, an accelerometer, a magnetometer, a depth camera, a visual camera or any other sensor from which motion can be determined. The information from the various systems described above may be used in combination to determine the motion of the depth camera at step 606.

At step 608, the computer processor may determine the motion of one or more objects in a capture scene. The processor may use the information indicative of motion of the depth camera, and other information received from the various sensors to determine the motion of the one or more objects in the capture scene.

At step 610, the computer processor may use the information about the current power state of the battery powered platform, the information about one or more objects in a capture scene, and information about the motion of the depth camera to allocate power consumption to each system on the battery powered device. The adjustments that may be made have been described above with respect to FIGS. 4-5.

At step 612, each of the systems on a battery powered device may be adjusted as described above. For example, the power consumption of a camera may be adjusted by adapting the frame rate.

Figure 7:
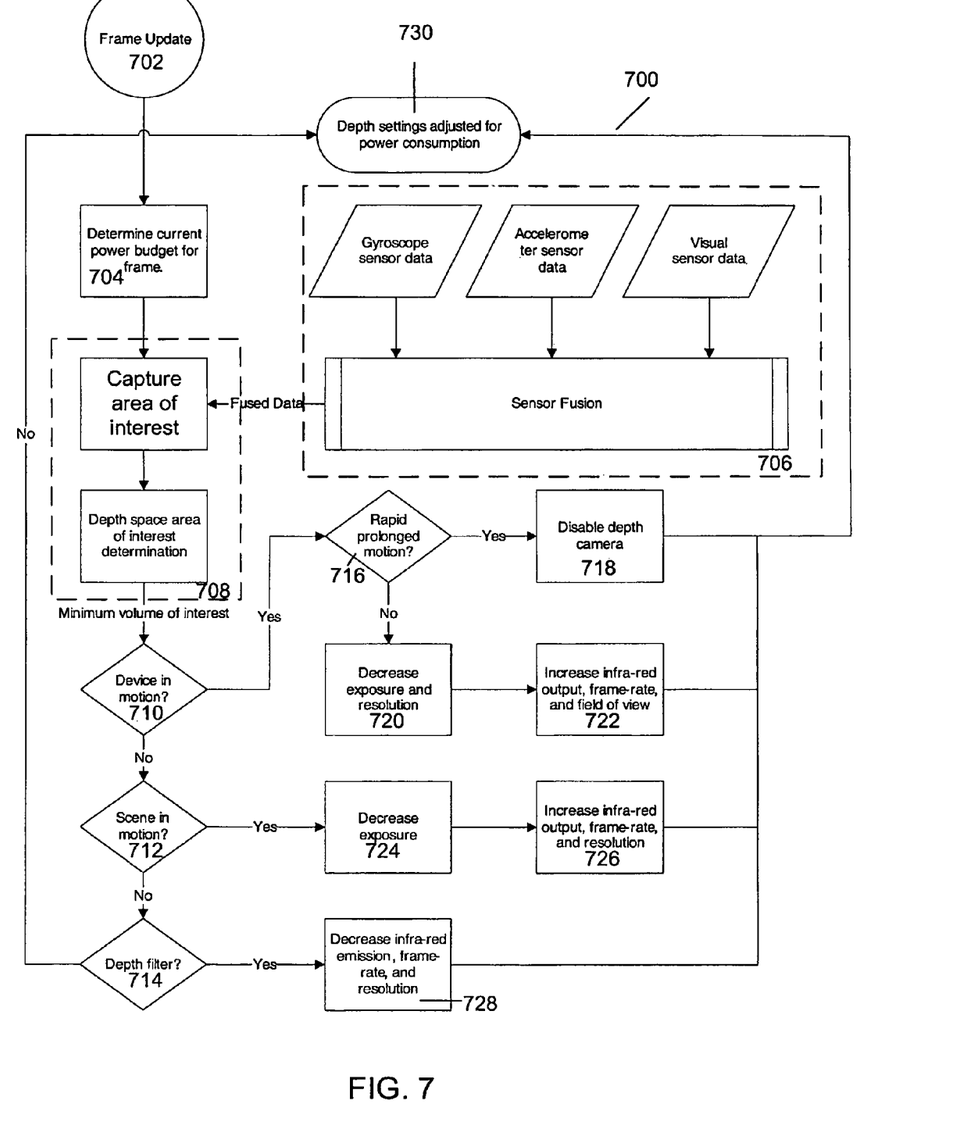
FIG. 7 is an example implementation of dynamic depth power equalization to determine the output power to the several systems on a battery powered platform.

FIG. 7 provides further details of one embodiment of a method 700 of that may be used to determine how to adjust power to one or more systems on a battery powered platform, such as the battery powered platform 10 of FIG. 2. At a frame update 702, the current power consumption 704 of the battery powered platform may be determined. The current power consumption 704 may be determined by an additional system 40 on the battery operated platform 10 described in FIGS. 1-2. In one embodiment, the additional system is a sensor which measures the remaining charge in a battery. The additional system may also measure the current charge provided to the battery powered platform by the battery.

The battery powered platform may use the information about the current power consumption 704 differently in different embodiments. In one embodiment, the battery powered platform may attempt to match the current power consumption to the final power consumption of the battery powered platform. In such a circumstance, battery life may be extended by providing a constant drain on the charge provided by a battery.

In another embodiment, the battery powered platform may attempt to maintain a constant average output from the battery, but may allow spikes and valleys in power consumption as long as those spikes and valleys stay within pre set limitations. In a third embodiment, the battery powered platform may allow large changes in power consumption, but may only allow relatively small changes in the overall power consumption of the battery powered platform over certain time periods (i.e. allowing large changes in overall power consumption, but only over long periods of time). In another example embodiment, the battery powered platform may allow large and/or rapid changes in power consumption to maintain a certain image quality, but the power consumption may drop significantly if image quality may be maintained at a lower power consumption rate.

At 706, information from one or more sensors is combined or fused for the capture area and depth space of interest 708. The one or more sensors depicted at 706 may correspond to the other detectors 24 referenced in FIG. 2 as well as the depth camera 12 referenced in FIGS. 1-2. These sensors may include an accelerometer 44, a gyroscope 42, a magnetometer 46, an RGB camera 40, any other type of camera or any other system or sensor 50 that may be used to determine the motion of the depth camera. The sensor may fuse the data to determine the motion of the depth camera, or the motion of one or more objects in a capture scene. In one embodiment, sensor fusion may comprise aligning the data from each of the sensors in time and combining that data. The information from the sensors may be combined in any other way to provide input for adjusting the power consumption of a battery operated platform The motion of the depth camera may factor into the types of adjustments that may be made to one or more systems on a battery powered platform. For example, if a depth camera is moving at a high rate of speed, one or more systems may need more power to maintain quality image capture. In another embodiment, if the depth camera is stationary, the depth camera may need less charge to provide quality image capture.

The information provided to the battery operated platform 10 at 708 may also be used to determine the motion of one or more objects in a capture scene, such as capture scenes 18 referenced in FIG. 1. Information from one or more detectors related to the change in depth of an object and the movement of the object may be combined to determine the motion of that object. The type of motion of the object and the speed of the movement may factor into a determination of the adjustments made in power consumption of one or more systems on a battery powered platform.

At 710, a determination of the motion of the device may be made. If the device is in motion, a further determination of the time period over which the motion takes place and the speed of the motion may be made at 716. If the device is not undergoing rapid and prolonged motion, adjustments to decrease the exposure and resolution 720, and increase the infrared output, the frame rate and the field of view of the depth camera 722 may be made. If the motion is rapid and prolonged, the depth camera may be totally disabled at 718.

At 712, a determination of the motion of the scene or one or more objects in a scene may be made. If the scene is in motion, the exposure may be decreased at 724, and adjustments may be made to increase the infrar-red output, frame-rate and resolution at 726.

At 714, a depth filter may determine the distance to objects and the requirements for detecting the depth of each. Depending on the depth filter, a decrease in infrared emission, frame rate and resolution may be made at 728.

As another example, if the depth camera is not in motion, and objects in the capture are not in motion, the emitters may emit less, the frame rate may decrease, and the resolution may also decrease. Such adjustments may take place because the system may have a high probability of obtaining accurate detection of a capture scene without spending large amounts of charge from a battery.

At 730, the depth settings and power consumption of the battery powered device may be determined based on the outcome of the various scenarios described above, which are merely and example embodiment and not the only way of implementing power consumption controls on a battery powered platform comprising a depth camera.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

What is claimed:

1. A method to control the consumption of power by a platform that comprises a depth camera, the method comprising:
    receiving a depth image captured by the depth camera;
    determining that an object in a capture area represented by the depth image is in motion, based on the depth image; and
    in response to determining that the object is in motion, increasing an amount of light output by an infrared component from a first nonzero value to a second value and increasing a field of view of the depth camera, the depth camera using light output by the infrared component to determine depth information of the capture area.

2. The method of claim 1, wherein receiving the depth image comprises:
    receiving information from a detector, the detector comprising a gyroscope, an accelerometer, a magnetometer, or a visual image scanner.

3. The method of claim 1, wherein increasing the amount of light output by the infrared component comprises adjusting the strength of the infrared component, a frequency of the infrared component, a number of pulses emitted by the infrared component over a time period, or a number of infrared components emitting light.

4. The method of claim 1, further comprising:
    in response to determining that the object is in motion, increasing a frame rate of an image sensor of the depth camera in capturing depth images from a third nonzero value to a fourth value.

5. The method of claim 1, wherein increasing the field of view of the depth camera comprises: defining a first capture area and a second capture area, each of the first and second capture areas being defined in the x, y and z directions, the second capture area having at least a x, y, or z dimension greater than a corresponding dimension of the first capture area; and adjusting the field of view of the depth camera from the first capture area to the second capture area.

6. The method of claim 1, further comprising:
    determining that a second object in the capture area represented by the depth image is in motion, based on the depth image; and
    increasing the amount of light output by the infrared component based on determining that the object is in motion, and based on determining that the second object is in motion.

7. The method of claim 1, further comprising:
    in response to determining that the object is in motion, decreasing a length of time of an image capture of the depth camera in capturing depth images.

8. A system to control power consumption by a platform that comprises a depth camera, comprising:
    a memory; and
    a processor communicatively coupled to the processor when the system is operational, the memory bearing processor-executable instructions that, when executed on the processor, cause the system to at least:
        receive a depth image captured by the depth camera;
        determine that an object in a capture area represented by the depth image is in motion, based on the depth image; and
        in response to determining that the object is in motion, increase an amount of light output by an infrared component from a first nonzero value to a second value, the depth camera using light output by the infrared component to determine depth information of the capture area, and
        increase a field of view of the depth camera in capturing depth images.

9. The system of claim 8, wherein the memory further bears processor-executable instructions that, when executed on the processor, cause the system to at least:
    in response to determining that the depth camera is in motion for more than a predetermined amount of time, disabling operation of the depth camera.

10. The system of claim 8, wherein the memory further bears processor-executable instructions that, when executed on the processor, cause the system to at least:
    in response to determining that the depth camera has moved more than a predetermined amount, disabling operation of the depth camera.

11. The system of claim 8, wherein the memory further bears processor-executable instructions that, when executed on the processor, cause the system to at least:
    in response to determining that the depth camera has moved for less than a predetermined amount of time, or for less than a predetermined amount of distance, increase the amount of light output by the infrared component.

12. The system of claim 8, wherein the memory further bears processor-executable instructions that, when executed on the processor, cause the system to at least:
    in response to determining that the depth camera has moved for less than a predetermined amount of time, or for less than a predetermined amount of distance, increase the frame rate of the depth camera in capturing depth images.

13. The system of claim 8, wherein the memory further bears processor-executable instructions that, when executed on the processor, cause the system to at least:
    in response to determining that the depth camera has moved for less than a predetermined amount of time, or for less than a predetermined amount of distance, increase the field of view of the depth camera in capturing depth images.

14. The system of claim 8, wherein the memory further bears processor-executable instructions that, when executed on the processor, cause the system to at least:
    in response to determining that the depth camera has moved for less than a predetermined amount of time, or for less than a predetermined amount of distance, decrease the length of time of an image capture of the depth camera in capturing depth images.

15. The system of claim 8, wherein the memory further bears processor-executable instructions that, when executed on the processor, cause the system to at least:

in response to determining that the depth camera has moved for less than a predetermined amount of time, or for less than a predetermined amount of distance, decrease a resolution of the depth camera in capturing depth images.

16. The system of claim 8, wherein the memory further bears processor-executable instructions that, when executed on the processor, cause the system to at least:

in response to determining that the object in the capture area represented by the depth image is closer to the depth camera than the object in the capture area in a previous depth image, decrease the amount of light output by the infrared component.

17. The system of claim 8, wherein the memory further bears processor-executable instructions that, when executed on the processor, cause the system to at least:

in response to determining that the object in the capture area represented by the depth image is closer to the depth camera than the object in the capture area in a previous depth image, decrease the frame rate of the depth camera in capturing depth images.

18. The system of claim 8, wherein the memory further bears processor-executable instructions that, when executed on the processor, cause the system to at least:

in response to determining that the object in the capture area represented by the depth image is closer to the depth camera than the object in the capture area in a previous depth image, decrease a resolution of the depth camera in capturing depth images.

19. A computer-readable storage device, excluding signals, bearing instructions for controlling a power consumption of a platform comprising a depth camera, that, when executed on a computer, cause the computer to perform operations comprising:

receiving a depth image captured by the depth camera;

determining that an object in a capture area represented by the depth image is in motion, based on the depth image; and in response to determining that the object is in motion, increase an amount of light output by an infrared component from a first nonzero value to a second value, the depth camera using light output by the infrared component to determine depth information of the capture area, increasing a frame rate of an image sensor of the depth camera in capturing depth images from a third nonzero value to a fourth value, increasing a field of view of the depth camera in capturing depth images, and decreasing a length of time of an image capture of the depth camera in capturing depth images.

* * * * *